United States Patent [19]
Kopf et al.

[11] 3,832,067
[45] Aug. 27, 1974

[54] COLORIMETER FOR DETECTING BLOOD LEAKS IN AN ARTIFICIAL KIDNEY MACHINE

[75] Inventors: J. David Kopf, Tujunga; Cole D. Bacon, Encino; Teryl W. Schwartz, Tujunga, all of Calif.

[73] Assignee: David Kopf Systems, Tujunga, Calif.

[22] Filed: Nov. 24, 1972

[21] Appl. No.: 309,152

[52] U.S. Cl............... 356/181, 250/573, 250/576, 356/184, 356/244
[51] Int. Cl. ............................................ G01j 3/50
[58] Field of Search ............ 210/321; 250/218, 573, 250/576; 356/181, 184, 244, 246

[56] References Cited
UNITED STATES PATENTS

| | | | |
|---|---|---|---|
| 1,924,139 | 8/1933 | Thomas | 250/218 X |
| 3,406,826 | 10/1968 | Willock | 210/321 X |
| 3,441,136 | 4/1969 | Serfass et al. | 210/321 X |
| 3,480,784 | 11/1969 | Pierce | 356/246 UX |
| 3,506,126 | 4/1970 | Serfass et al. | 210/321 X |
| 3,560,099 | 2/1971 | Boe et al. | 356/246 |

Primary Examiner—John K. Corbin
Assistant Examiner—F. L. Evans
Attorney, Agent, or Firm—Bruce H. Johnsonbaugh

[57] ABSTRACT

A colorimeter is provided that senses the presence of a contaminant opaque to light of a specific color which is carried in a fluid flowstream. As the flowstream passes through the colorimeter, a photocell on one side of the flowstream is illuminated only by light of the specific color which originates on the opposite side of the flowstream, the photocell sensing a change in intensity of transmitted light caused by presence of the contaminant.

6 Claims, 4 Drawing Figures

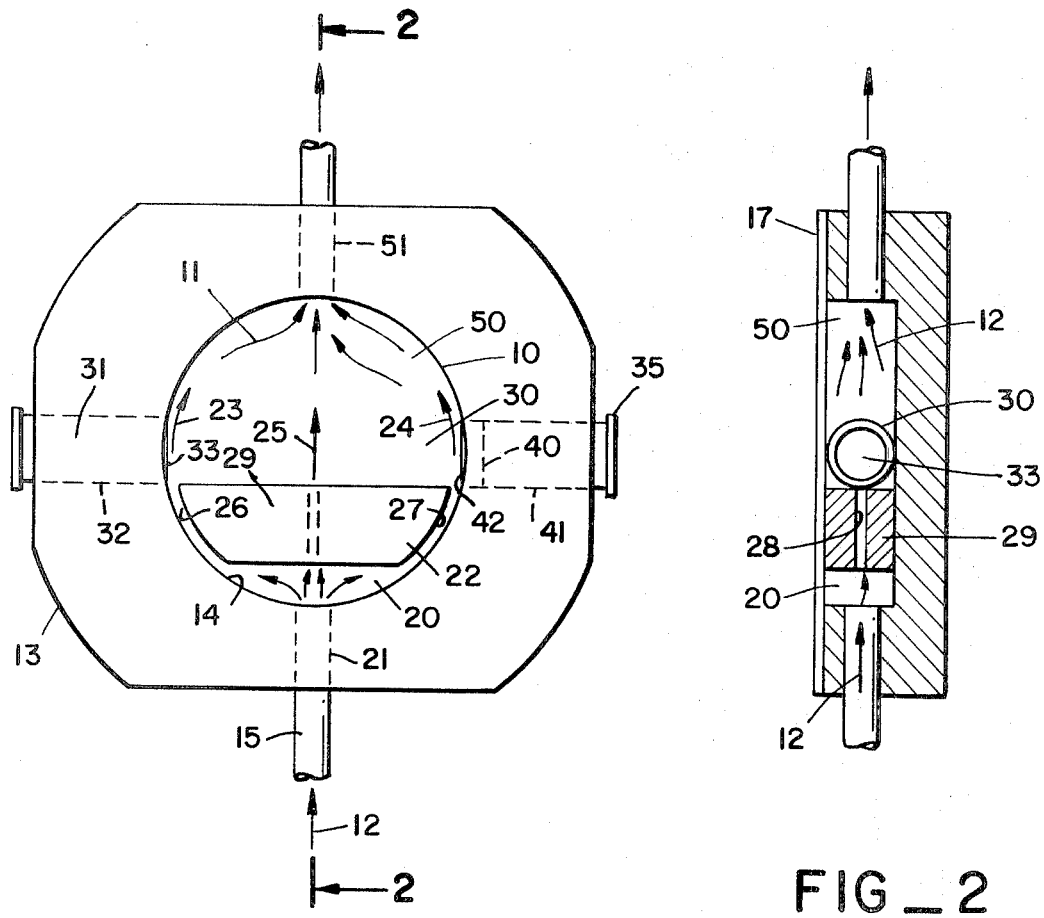
FIG_1
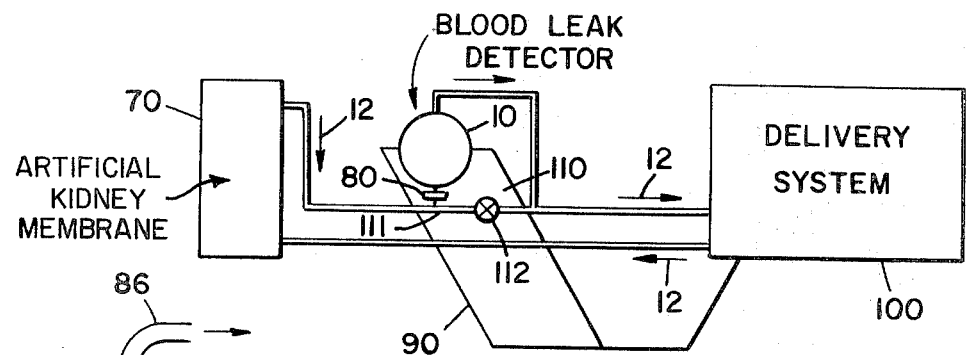
FIG_2
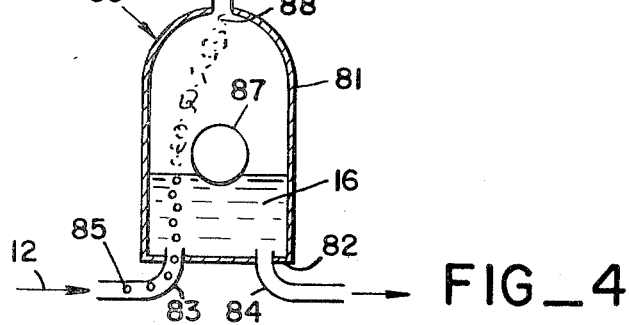
FIG_3
FIG_4

COLORIMETER FOR DETECTING BLOOD LEAKS IN AN ARTIFICIAL KIDNEY MACHINE

This invention relates generally to colorimeters and more specifically to blood leak detectors for use in artificial kidney machines.

Colorimeters of the type shown in United States Pat. No. 3,560,099 to C.T. Boe et al. for "Colorimeter flow cell including a baffle to remove gas bubbles" are known in this art. A weakness of the Boe device is that it responds to contaminants of various colors since it measures only the difference in intensity between a reference light beam and the measuring light beam. Another shortcoming of the Boe device is the tortuous flowpath through which the flowstream passes, which tends to create vortices and to limit the velocity of the flowstream over the lenses.

A primary object of this invention is to provide a colorimeter which senses the presence of a contaminant by responding to the opacity of the contaminant to light of a specific color.

Another object of this invention is to provide a colorimeter which responds only to contaminants opaque to light of a specific color.

A further object of this invention is to provide a colorimeter which may be miniaturized because noise and spurious signals are reduced to a minimum.

A further object of this invention is to provide a detector in which the flowpath of the fluid being examined is virtually free of vortices which might otherwise create noise and spurious signals.

A further object of this invention is to provide a detector in which a portion of the fluid being examined is guided along a direct and short path at high velocity to the detection stage at which the high velocity fluid continually washes the surfaces of the detection elements.

Further objects and advantages of this invention will become apparent from the following description and drawings in which:

FIG. 1 is a front view of the detector with the front cover removed;

FIG. 2 is a sectional view along the lines 2—2 of FIG. 1;

FIG. 3 is a schematic representation showing the blood leak detector connected to an artificial kidney machine; and FIG. 4 is a side elevational view, in section, of a separator used in conjunction with the detector.

FIG. 1 shows an enclosed flow cell 10 with an inlet stage 20, a detection stage 30 and an outlet stage 50. A flowstream shown by arrows 12 flows under pressure through an inlet tube 15, inlet passageway 21, through inlet stage 20, detection stage 30 and outlet stage 50 of enclosed flow cell 10 and through outlet passageway 51. When used in an artificial kidney machine, the flowstream 12 is dialysate solution which as shown in FIG. 3, flows through the kidney membrane 70, through separator 80 and the blood leak detector 10 of this invention and then to drain.

When used in an artificial kidney machine, the detector of this invention is used to continuously and automatically monitor the dialysate solution and responds to the presence of blood by sensing its opacity to green or blue-green light.

As the flowstream 12 of dialysate solution flows into inlet stage 20, diverter means 22 splits the flowstream 12 into three components, which are high velocity streams 23 and 24 and a stabilizing stream 25. The interior of flow cell 10 is a cavity 11 which is bounded by a smooth wall 14. Diverter means 22 comprises a diverter block 29 with smooth surfaces 26 and 27 which are closely adjacent to and parallel with the smooth wall 14 of the enclosed flow cell 10. Surfaces 26 and 27 guide the dialysate solution to detection stage 30 along a direct and smooth flowpath at a high velocity. A passageway 28 in diverter block 29 is provided through which stabilizing stream 25 passes to reduce the onset of vortices in the detection stage 30.

As an example, the following dimensions will produce the desired results for flowstream flowrates between 0 – 1,000 ml./mon.: diameter of cavity 11—2.0 in.; depth of cavity 11—0.375 in.; clearance between surfaces 26 and 27 and wall 14—0.015 in. to 0.020 in.; diameter of passageways 21 and 51—0.187 in.; diameter of passageway 28—0.062 in.

In this embodiment, a white light source 31 is mounted in detection stage 30. A cylindrical light source may be used which slidably fits into passageway 32 formed in the body 13 of enclosed flow cell 10. A lens 33, the surface of which forms a smooth continuous surface with wall 14, directs the light from light source 31 across the flow cell to illuminate photocell 35. A cylindrical passageway 41 in body 13 slidably receives optical filter 40 and photocell 35. A window 42 over optical filter 40 has a surface which forms a smooth continuous surface with wall 14. By mounting light source 31 on the opposite side of detection stage 30 from optical filter 40 and photocell 35, and by aligning the output of light source 31 in a direction towards filter means 40 and photocell 35, filter means 40 and photocell 35 are illuminated by light source 31 and receive substantially all the light from light source 31.

In this embodiment filter means 40 transmits only light to which the contaminant is opaque. When the contaminant is blood, filter means 40 transmits only green light. Contaminants not opaque to green light thus will not affect the output of photocell 35. Only the presence of a contaminant opaque to green light will affect the output of photocell 35.

As used in this specification and claims, the term "opaque" as applied to a contaminant means that the contaminant transmits only a portion of light of a specific color which impinges on it. The contaminant need not be impervious to a specific color of light to be opaque to it. As examples, blood is opaque to green and blue-green light. A contaminant of a known color is opaque not only to light of its complementary color, but is also opaque to variations of the complementary color.

In the embodiment described above, light generating means comprises light source 31 and filter means 40. Light generating means also includes a monochromatic light source which produces light of a specific color to which the contaminant is opaque.

Regardless of which light generating means is used, photocell 35 "sees" only light of a specific color, which light is absorbed substantially by the contaminant, thereby decreasing the intensity of the light impinging on the photocell 35.

High speed streams 23 and 24 continually wash the lens 33 and window 42 of filter means 40, thereby preventing the accumulation of bubbles, contaminants or other debris on lens 33 and surface 42.

FIG. 2 shows cover 17 which encloses cavity 11 of body 13. It also shows passageway 28 and lens 33. The outlet stage 50 is mounted above inlet stage 20 and passageway 28 is oriented vertically.

Drain means 110, shown in FIG. 3, comprises bypass line 111 and restriction 112 which are mounted below inlet stage 20 of the flow cell 10. Restriction 112 is sufficiently small that only a small portion of the flowstream passes through it during operation of the artificial kidney machine, but large enough to drain the enclosed flow cell 10 when the flow of dialysate solution through flow cell 10 stops.

A bubble separator 80 shown in FIG. 4, is used to remove entrained gas from flowstream 12 before it enters the inlet stage 20 of flow cell 10. Separator 80 has a cap 81 and bottom cover 82 which seals against cap 81. Cover 82 receives an inlet conduit 83 containing the flowstream 12 of dialysate solution with entrained gas 85 and outlet conduit 84 through which flowstream 12 passes after the entrained gas 85 has been removed. Conduits 83 and 84 form a water tight seal with bottom cover 82. Entrained gas 85 rises out of the dialysate solution 16 and passes through vent 86 to atmosphere. Outlet conduit 84 carries the deaerated dialysate solution into conduit 15, through inlet passageway 21 and into inlet stage 20. Float 87 seals against seat 88 to prevent drainage of flowstream 12 through vent 86.

The amount of noise and other spurious signals generated in the system is reduced, and a high signal to noise ratio attained, by the continuous washing of lens 33 and window 42, by the reduction of vortices in detection state 30 due to stabilizing stream 25, by the selective response of photocell 35 to only light a specific color by the separation of entrained gas by separator 80. By reducing the amount of noise and other spurious signals, the photocell output can be greatly amplified (about 10,000 times) and the overall size of the colorimeter may be miniaturized.

As shown in FIG. 3, a delivery system 100 pumps a flowstream 12 of dialysate solution through kidney membrane 70, through separator 80 and flow cell 10 and then to drain. Alarm means 90 is connected to the output of photocell 35, and triggers an alarm within delivery system 100 which automatically shuts off the flow of dialysate solution to the kidney membrane 70 when the output of photocell 35 changes.

Thus in operation, as uncontaminated dialysate solution flows through inlet stage 20, detection stage 30 and outlet stage 50, the output of photocell 35 remains constant. When blood is present in the dialysate solution, the intensity of the green light passing through filter means 40 decreases, thereby changing the output of photocell 35. The change in the output of photocell 35 is amplified and is used to trigger alarm means 90, and the flow of dialysate solution from the delivery system 100 is automatically shut off.

We claim:

1. A detector for use in an artificial kidney machine for sensing the presence of blood in the flowstream of dialysate solution comprising:

an enclosed flow cell with an inlet stage, a detection stage and an outlet stage through which said dialysate solution flows diverter means in said inlet stage guiding a portion of said dialysate solution at high velocity along a direct path to said detection stage a passageway in said diverter means through which a stabilizing stream of said dialysate solution flows a photocell mounted in said detection stage and a monochromatic source of light of a color to which blood is opaque that illuminates said photocell and said dialysate solution as it flows through said detection stage.

2. The device of claim 1 in which said outlet stage is above said inlet stage and said passageway in said diverter means is oriented vertically.

3. The device of claim 2 further comprising drain means that drains dialysate solution remaining in said enclosed flow cell when the flow of dialysate solution through said enclosed flow cell stops.

4. The device of claim 1 in which said monochromatic source of light produces green light.

5. The device of claim 1 in which said monochromatic source of light produces blue-green light.

6. A detector for use in an artificial kidney machine for sensing the presence of blood in the flowstream of dialysate solution comprising:

an enclosed flow cell with an inlet stage, a detection stage and an outlet stage through which said dialysate solution flows diverter means in said inlet stage guiding a portion of said dialysate solution at high velocity along a direct path to said detection stage a passageway in said diverter means through which a stabilizing stream of said dialysate solution flows a photocell mounted in said detection stage and a light source that illuminates said photocell and said dialysate solution as it flows through said detection stage, and filter means between said light source and said photocell which passes only light of a color to which blood is opaque.

* * * * *